June 20, 1961    C. O. DENNIS ET AL    2,988,780
CURING RIMS
Filed Nov. 12, 1958

INVENTORS
Clement O. Dennis and
William C. Shaver
BY Mason, Fenwick & Lawrence
ATTORNEYS

United States Patent Office 2,988,780
Patented June 20, 1961

2,988,780
CURING RIMS
Clement O. Dennis and William C. Shaver, Macon, Ga., assignors, by direct and mesne assignments, to Precision Recapping Equipment Company, Macon, Ga., a corporation of Georgia
Filed Nov. 12, 1958, Ser. No. 773,328
2 Claims. (Cl. 18—45)

This invention relates to curing rims for tire retreading molds, and particularly to curing rims for use with retreading matrices of the type known as band molds.

The so-called band mold is designed to be used without expensive stands or supports, and to withstand tremendous side pressures against the mold skirts without the need for side support, such as the above-mentioned stands provide. The curing tube, or air bag, used to press the tire being treated tightly into the matrix, must be held against inward expansion, or it will blow out. Curing rims, or back-up plates, have been used for this purpose.

In order to secure a better seal between the tire casing, air bag, and rim, it has been proposed to use an oval, or relatively flat, air bag with a rim of such dimensions that the rim will be in tight engagement with the inner surface of the casing, and the casing in tight engagement with the flange of the matrix. This will prevent blowout.

It is customary, however, to provide tires of several different diameters in one size category. All of these can be retreaded in a single mold, but they fit the mold with their side walls in different angular positions relative to the side skirts of the matrix, or mold. The mold is usually designed for the medial diameter of the several in the category, and this tire will fit the mold without expansion or compression. Tires smaller than this require expansion to fit the matrix, and this causes the side walls of the tire to contract toward one another. If the curing rim used is of the proper size to seal this tire, it will be too small in diameter to make a seal with the side walls of tires of larger diameter, where the side walls are spread farther apart. Thus, pressure within the air bag will cause the bag to blow out between the rim and tire side wall. In the past, it has been necessary to have rims of different diameters to seal when locked within tires of different diameters.

The object of the present invention is to provide a curing rim which can be used with tires of all the diameters within a given size category.

A more specific object of the invention is to provide a curing rim of circular form which can be expanded to vary its diameter.

Another object is to provide a curing rim of a plurality of arcuate sections which, when placed together end to end, form a circle, and a plurality of spacer members for placement between the ends of abutting sections to vary the diameter of the assembled rims.

Other objects of the invention will become apparent from the following description of one practical embodiment thereof, when taken in conjunction with the drawings which accompany, and form part of, this specification.

Figure 5:
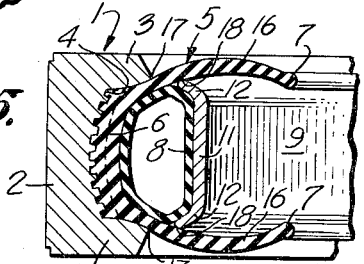
Figure 4:
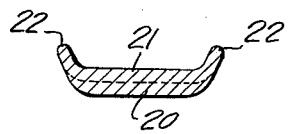
FIGURE 4 is a transverse section through the rim, taken on the line 4—4 of FIGURE 2; and, FIGURE 5 is a section taken through one side of a band mold and showing a tire, air bag, and curing rim in place to illustrate the manner in which the seal is made between the rim and tire casing.

Referring to the drawings in detail, and first adverting to FIGURE 5, there is shown a typical cross-section of the matrix 1 of a band type mold. The body 2 of the matrix, of course, is circular, and carries at its opposite sides short annular skirts 3. The inner faces of the body and skirts are contoured to form a mold cavity 4 for top capping a tire.

A tire casing 5, having a cap strip 6 of new rubber, is placed in the mold for vulcanizing. As the inside diameter of the mold skirts 3 is somewhat less than the inside diameter of the mold cavity, the outside diameter must be reduced to insert the tire. This is done by spreading the tire beads 7 to draw in the face of the casing. When the center plane of the tire is in the center plane of the mold, the beads are released and the tire cap moves into the mold cavity.

When the tire is in place, an air bag 8 is inserted within the tire casing. The bag, when inflated, will exert pressure upon the tire to force it into the cavity, and the new rubber into the design of the matrix. The bag, preferably, will be oval or relatively flat, as shown in FIGURE 5. The bag, of course, must have a back-up member of some sort against which it can act to provide the necessary pressure against the tire.

Figure 1:
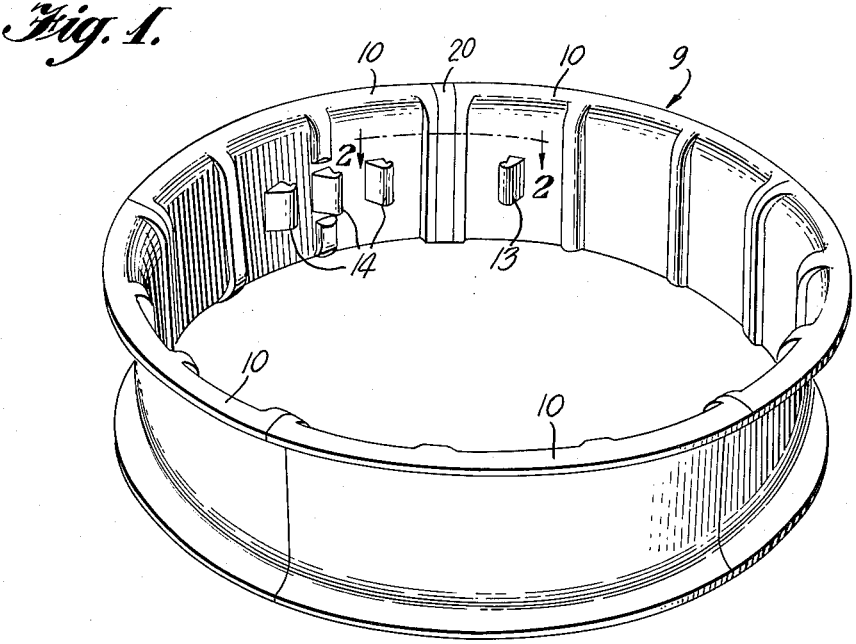
FIGURE 1 is a perspective view of a curing rim for retreading molds constructed in accordance with the present invention.
Figure 2:
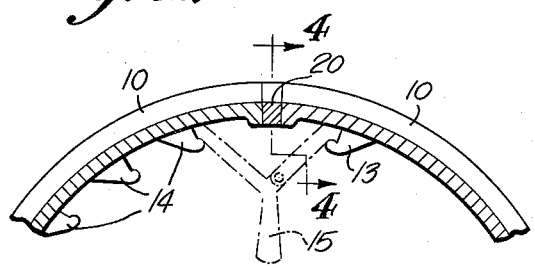
FIGURE 2 is a section through the mold at a joint with a separator, or spacer, in place, and is taken substantially on the line 2—2 of FIGURE 1.
Figure 3:
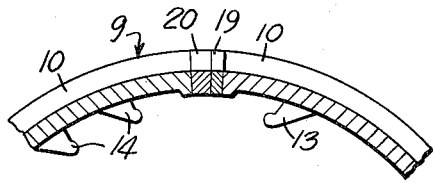
FIGURE 3 is a view similar to FIGURE 2, but showing two spacers in position.

Rim 9 provides the necessary surface against which the air bag may seat. The rim is composed of several sections 10, each of which is arcuate and an aliquot part of the circle which the several sections form when assembled in end abutting relation. The ends of the sections are inclined, being radial to the inner circle. This causes an interlocking of the sections when the bag pressure is against them. Each section is formed in transverse section as a flat central portion 11, with outwardly extending flanges 12 at the sides. Adjacent ends of two of the sections adapted to be arranged side by side, are provided with lugs 13 and 14. The lug 13 is a single lug used as a lever fulcrum for a spreading tool (such as shown in dotted lines at 15 in FIGURE 2), and the lugs 14 are spaced apart to provide a plurality of members against which the tool may selectively engage for separating the ends of the adjacent rim sections.

Referring again to FIGURE 5, it will be seen that the short skirts 3 of the matrix are adapted to engage the outer surfaces of the side walls 16 of the casing at points 17 when pressed outwardly by the inflated air bag 8. After the casing and air bag are in place, the several sections of the rim are inserted in the casing and arranged in circular form. In order for the complete circle to be formed, it is necessary for the last joint to be spread to allow the inclined ends of the sections at the joint to seat. This is done by using a spreading tool in engagement with the lugs 13 and 14, as described.

If the tire casing used in the above procedure is of the smallest size of the range accommodated by the mold, the rim, when in locked condition, will have its flanges bearing tightly against the inner surfaces of the tire side walls 16. The bearing lines 18 of the rim flanges 12 against the side walls of the tire will be removed inwardly of the annular mold relative to the bearing points 17 of the casing against the mold skirts 3. Due to the stiffness of the short length of tire wall between the bearing points, the air bag will be tightly confined and there can be no blow out. If, however, the tire used is larger than the one mentioned, the side walls will be spread farther apart as they emerge from the mold, because the tread face of the tire does not have to be expanded so much in seating the tire in the mold. Consequently, the rim will not be in tight engagement with the casing walls, when in locked position.

In order to rectify this condition, the present invention provides means for increasing the diameter of the rim circle to the extent required to bring the rim flanges into contact with the tire wall. This comprises one or more inserts 19 and 20, adapted to be placed between the abutting ends of the rim sections carrying the lugs 13 and 14. Each spacer is identical in cross-section to the rim sections so that they may form continuations of the sections, thus, each section has a central portion 21 and flanges 22. The side surfaces of the spacers will be inclined to the radii of the circle of the rim so that the spacers will fit flush against the ends of the rim sections. The spacer, or spacers as the case may be, is inserted between the section ends after they have been spread apart by the spreading tool.

Although spacers of many different sizes may be provided, it has been found that two, one of one-half inch width and the other of one inch width, will suffice for most installations. By using one or the other, or both in combination, the circumference of the rim can be increased one-half inch, one inch, or one and one-half inches.

This means of varying the rim diameter to maintain sealing contact with the casing wall is extremely simple, yet effective. The spacers will be self aligning, and will automatically lock in place in the rim when pressure is in the air bag. By using the spacers, the need for additional rim size is entirely eliminated, as one rim with its spacers will suffice for all retreading operations with a single band mold.

While in the above one practical embodiment of the invention has been disclosed, it will be understood that the precise structural details shown and described are merely by way of illustration, and the invention may take other forms within the scope of the appended claims.

What is claimed is:

1. A curing rim for use with band type recapping molds having annular mold cavities formed of a circular tread-patterned matrix and annular side skirts into which a tire being capped is seated by pressure of an air bag within the tire and bearing against a curing rim also within the tire between the side walls of the tire, the curing rim comprising, a plurality of independent unconnected arcuate sections adapted when assembled in end abutting relation to form a circle, each section being an aliquot part of the circle and having its ends lying in planes radial to the circle, each section being elongated in its arcuate direction and C-shaped in cross-section having a flat central section and outwardly extending side flanges adapted to bear against the inner walls of a tire to press the tire walls against the mold side skirts to confine the air bag within the tire, and a set of spacers, each spacer of the set being of identical cross-section to the rim sections and having sides radial to the rim circle for selective positioning between the ends of adjacent rim sections to vary the diameter of the rim in accordance with widthwise spacing between the side walls of a tire being cured to seat the rim side flanges firmly against the tire walls and prevent blowout of the tube between the rim flanges and tire side walls.

2. In a curing rim for use in retreading tires as claimed in claim 1, spreading lugs formed adjacent the abutting ends of two of the rim sections, whereby the rim sections carrying the lugs may be spread apart to receive the spacer between them.

References Cited in the file of this patent

UNITED STATES PATENTS

| | | |
|---|---|---|
| 1,289,769 | Hopkinson | Dec. 31, 1918 |
| 1,317,904 | Anderson et al. | Oct. 7, 1919 |
| 1,331,146 | Fothergill | Feb. 17, 1920 |
| 1,472,881 | Midgley | Nov. 6, 1923 |
| 2,398,151 | Napier | Apr. 9, 1946 |
| 2,679,662 | Pfeiffer | June 1, 1954 |
| 2,697,252 | Clark | Dec. 21, 1954 |
| 2,817,877 | Fannen | Dec. 31, 1957 |

FOREIGN PATENTS

| | | |
|---|---|---|
| 167,808 | Great Britain | Aug. 21, 1921 |